(12) United States Patent
Yun et al.

(10) Patent No.: US 9,625,968 B2
(45) Date of Patent: Apr. 18, 2017

(54) METHOD FOR OPERATING MULTIPLE STANDBY STATES AND BROADCAST RECEIVING APPARATUS USING THE SAME

(75) Inventors: Jung Mee Yun, Sungnam-si (KR); Sang Hak Lee, Sungnam-si (KR)

(73) Assignee: KOREA ELECTRONICS TECHNOLOGY INSTITUTE, Seongnam-si, Gyeonggi-Do (KR)

(*) Notice: Subject to any disclaimer, the term of this patent is extended or adjusted under 35 U.S.C. 154(b) by 219 days.

(21) Appl. No.: 14/403,502

(22) PCT Filed: Jul. 5, 2012

(86) PCT No.: PCT/KR2012/005329
§ 371 (c)(1),
(2), (4) Date: Nov. 24, 2014

(87) PCT Pub. No.: WO2013/176333
PCT Pub. Date: Nov. 28, 2013

(65) Prior Publication Data
US 2015/0143151 A1    May 21, 2015

(30) Foreign Application Priority Data

May 25, 2012   (KR) .......................... 10-2012-0056155

(51) Int. Cl.
*G06F 1/32*       (2006.01)
*H04N 5/63*      (2006.01)
*H04N 21/443*  (2011.01)

(52) U.S. Cl.
CPC .......... *G06F 1/3203* (2013.01); *G06F 1/3287* (2013.01); *H04N 5/63* (2013.01);
(Continued)

(58) Field of Classification Search
CPC ..................................................... G06F 1/3296
See application file for complete search history.

(56) References Cited

U.S. PATENT DOCUMENTS

| | | | | |
|---|---|---|---|---|
| 6,097,679 A | * | 8/2000 | Ohtaki | G11B 19/02 369/47.11 |
| 6,216,187 B1 | * | 4/2001 | Truong | G06F 1/1632 710/303 |

(Continued)

FOREIGN PATENT DOCUMENTS

| KR | 10-0667842 B1 | 1/2007 |
|---|---|---|
| KR | 10-2011-0021200 A | 3/2011 |
| KR | 10-2011-0073324 A | 3/2013 |

OTHER PUBLICATIONS

Michael B Motlhabi, Advanced Android Power Management and Implementation of Wakelocks, Lecture Material, p. 1-5, South Africa.

(Continued)

*Primary Examiner* — Nitin Patel
(74) *Attorney, Agent, or Firm* — Hauptman Ham, LLP

(57) ABSTRACT

A method for operating multiple standby states and a broadcast receiving apparatus using the same are provided. The method for operating multiple standby states includes releasing, by a framework, a full wake lock for an electronic device, and acquiring, by the framework, a partial wake lock for the electronic device and entering a first standby state. Accordingly, a broadcast receiving apparatus based on an Android framework can operate multiple standby states which are designated by an application.

4 Claims, 8 Drawing Sheets

(52) U.S. Cl.
CPC ..... *H04N 21/4432* (2013.01); *H04N 21/4436* (2013.01); *G06F 1/3293* (2013.01)

(56) References Cited

U.S. PATENT DOCUMENTS

| | | | |
|---|---|---|---|
| 7,411,631 B1* | 8/2008 | Joshi | H04N 5/63 348/730 |
| 2005/0076256 A1* | 4/2005 | Fleck | G06F 1/3203 713/320 |
| 2005/0246563 A1* | 11/2005 | Chandley | G06F 1/3203 713/320 |
| 2008/0307240 A1* | 12/2008 | Dahan | G06F 1/06 713/320 |
| 2009/0019185 A1* | 1/2009 | Kardach | G06F 1/3203 710/5 |
| 2010/0023788 A1* | 1/2010 | Scott | G06F 1/3209 713/320 |
| 2011/0004776 A1* | 1/2011 | Tanaka | H04N 1/00885 713/323 |
| 2011/0040989 A1* | 2/2011 | Keyes | G06F 1/1626 713/300 |
| 2012/0210032 A1* | 8/2012 | Wang | G06F 13/24 710/260 |

OTHER PUBLICATIONS

International Search Report for application No. PCT/KR2012/005329 dated Feb. 6, 2013.

* cited by examiner

FIG. 2

| PM State | Processor PM | Android PM | ACPO (for reference) ||
|---|---|---|---|---|
| | | | System | Devices |
| Active | Active State | Awake State | S0 | D0 ~ D3 |
| Active Standby | Active State | Standyby State | S1 | D1 ~ D3 |
| Passive Standby | Shutdown State | Sleep State | S3 | D3 | de# METHOD FOR OPERATING MULTIPLE STANDBY STATES AND BROADCAST RECEIVING APPARATUS USING THE SAME

CROSS-REFERENCE TO RELATED APPLICATION

This application is a National Stage of International Application No. PCT/KR2012/005329, filed on Jul. 5, 2012, and claims priority from Korean Patent Application No. 10-2012-0056155 filed on May 25, 2012, the disclosure of which is incorporated herein in its entirety by reference.

TECHNICAL FIELD

Methods and apparatuses consistent with exemplary embodiments relate to a method for operating multiple standby states, and more particularly, to a method for operating multiple standby states in a broadcast receiving apparatus.

BACKGROUND

The power management policy of Linux is mainly designed for personal computers (PCs) and thus supports a power mode like Suspend or hibernate, which is similar to a window system. In addition, the power management policy of Linux is designed to be able to control a power state on Linux applications.

Recently, the Linux-based Android platform is increasingly used instead of the existing Linux platform. Since the Android platform is designed based on mobile devices such as smartphones, its power control policy is designed for the sake of battery saving.

The Power Management (PM) policy provided by the Android platform prohibits an application from performing PM itself.

Accordingly, there is a problem that the Android platform cannot be used when an operating method different from a power state provided by the Android platform is adopted.

SUMMARY

One or more exemplary embodiments provide a method for operating multiple standby states which are designated by a high-rank application by utilizing power management policy provided by a specific framework such as Android, and a broadcast receiving apparatus using the same.

According to an aspect of an exemplary embodiment, there is provided a method for operating multiple standby states including: releasing, by a framework, a full wake lock for an electronic device; and acquiring, by the framework, a partial wake lock for the electronic device and entering a first standby state.

The method may further include: shutting down a main processor; and releasing, by the framework, the partial wake lock and entering a second standby state.

The method may further include: waking up the shutdown processor; and acquiring, by the framework, the partial wake lock and returning to the first standby state.

The waking up may be performed by an auxiliary processor which is communicably connected with a processor.

The method may further include acquiring, by the framework, the full wake lock for the electronic device and returning to an active state.

The electronic device may be an STB, and the framework may be an Android framework.

According to the present disclosure as described above, a broadcast receiving apparatus based on an Android framework such as an STB can operate multiple standby states which are designated by an application.

BRIEF DESCRIPTION OF THE DRAWINGS

The above and/or other aspects of the invention will become and more readily appreciated from the following description of the exemplary embodiments, taken in conjunction with the accompanying drawings of which:

FIG. 2 is a power state mapping table for mediating in PM policy among a processor, an Android framework, and a Linux kernel;

DETAILED DESCRIPTION OF EXEMPLARY EMBODIMENTS OF THE INVENTION

Figure 1:
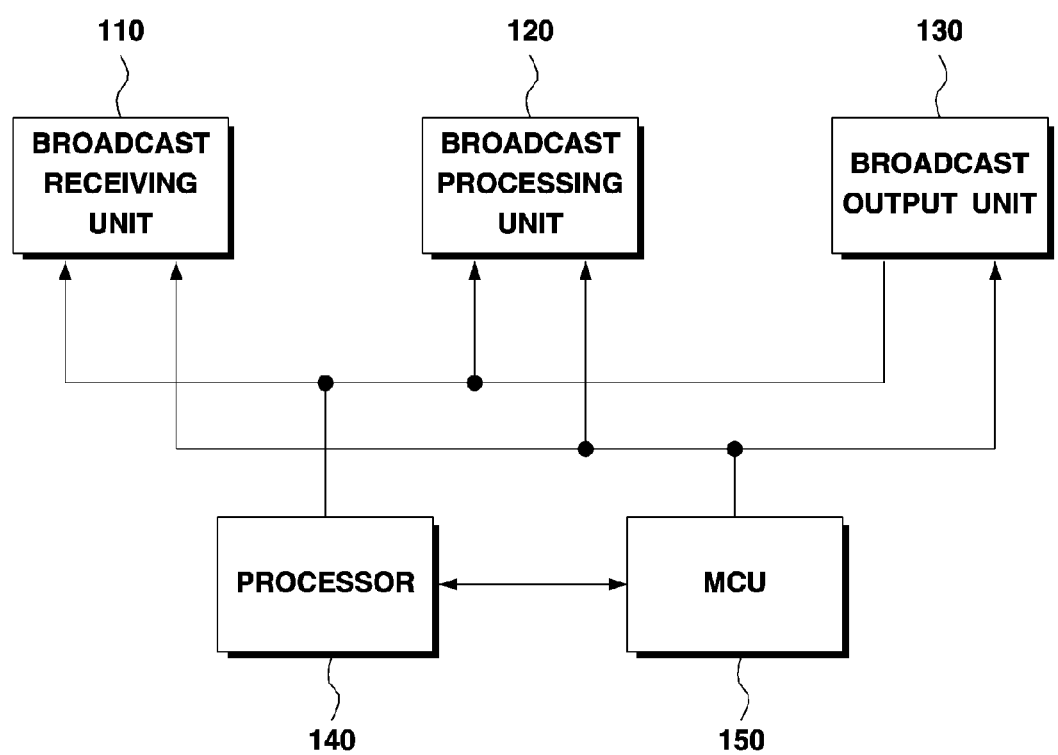
FIG. 1 is a block diagram showing an H/W configuration of a Set-Top Box (STB) to which the present disclosure is applicable.

Reference will now be made in detail to the present exemplary embodiments of the present disclosure, examples of which are illustrated in the accompanying drawings, wherein like reference numerals refer to the like elements throughout. The exemplary embodiments are described below in order to explain the present disclosure by referring to the figures.

1. Configuration of STB H/W

FIG. 1 is a block diagram showing an H/W configuration of an STB to which the present disclosure is applicable. The STB to which the present disclosure is applicable includes a broadcast receiving unit 110, a broadcast processing unit 120, a broadcast output unit 130, a processor 140, and a Micro Control Unit (MCU) 150, as shown in FIG. 1.

The broadcast receiving unit 110 receives broadcast streams via various media such as the Internet, a cable, a satellite, and the like.

The broadcast processing unit 120 divides the broadcast streams received by the broadcast receiving unit 110 into video, audio, and additional information, and decodes, signal-processes, and outputs the video and the audio.

The broadcast output unit 130 transmits the decoded/signal-processed video and audio, which are received from the broadcast processing unit 120, to a television (TV) connected to the STB, so that a broadcast program consisting of the video and the audio is output through the TV.

The processor 140 functions as a main processor for controlling the broadcast receiving unit 110, the broadcast processing unit 120, and the broadcast output unit 130. The MCU 150 functions as an auxiliary processor for controlling supplying/shutting off power to the broadcast receiving unit 110, the broadcast processing unit 120, and the broadcast output unit 130.

Communication between the processor 140 and the MCU 150 is performed according to the RS-485 standard.

2. Functions of STB

The functions performed in the STB may be divided into a main function and a background function. The main function refers to the STB's original function such as broadcasting, Video On Demand (VOD) service, recording, and the like, and the background function refers to a function for facilitating the main function such as STB S/W update, Event Information Table (EIT) update, and the like.

3. Power State of STB

The power state of the STB to which the present disclosure is applicable is divided into an active state, an active standby state, a passive standby state, and an off state, which will be explained in detail below.

3.1. Active State

The active state is a state in which power is supplied to the STB and both the main function and the background function can be performed. In the active state, the STB is able to selectively perform the main function and the background function or perform both of them.

When the user presses an OFF button of a remote controller in the active state or an active standby timer times out without any input to the remote controller, the STB changes into the active standby state, which will be described below.

3.2. Active Standby State

The active standby state is a power state in which power is supplied to the STB and the main function cannot be performed and only the background function can be performed.

In the active standby state, 1) when a user command is input (regardless of what command is input), the STB changes into the active state, 2) when the user turns off a power switch and thus shuts off the power to the STB, the STB 100 changes into the off state, and 3) when a passive standby timer times out, the STB changes into the passive standby state, which will be described below.

3.3. Passive Standby State

The passive standby state is a power state in which power is supplied to the STB and neither the main function nor the background function is performed. In the passive standby state, a current time and an operation state of the STB are displayed through a front panel and it is just detected whether a user command is input or not through the front panel or the remote controller.

In the passive standby state, 1) when a user command is input (regardless of what command is input), the STB changes into the active state, 2) when the user turns off the power switch and shuts off the power to the STB, the STB changes into the off state, and 3) when time to perform the background function arrives or an active standby change timer times out, the STB changes into the active standby state.

3.4. Off State

The off state is a power state in which power is not supplied to the STB and none of the functions are performed. That is, in the off state, the display function and the detecting function which are performed in the passive standby state are not performed.

4. STB S/W-Kernel/Framework

Since the processor of the STB shown in FIG. 1 is based on the Android framework and the Linux kernel, the STB performs Power Management (PM) by using a power state mapping table shown in FIG. 2 to mediate in the PM policy among the processor, the Android framework, and the Linux kernel. Hereinafter, the PM will be explained according to 4 types of power state.

4.1. Active State

In the active state, all of the processor, the Android framework, and the Linux kernel are in an active/wake state, and the blocks of the STB are selectively managed as in D0-D3 of the ACPI to reduce power consumption.

4.2. Active Standby State

In the active standby state, the processor is in an active state and the Android framework is in a standby state.

Figure 3:
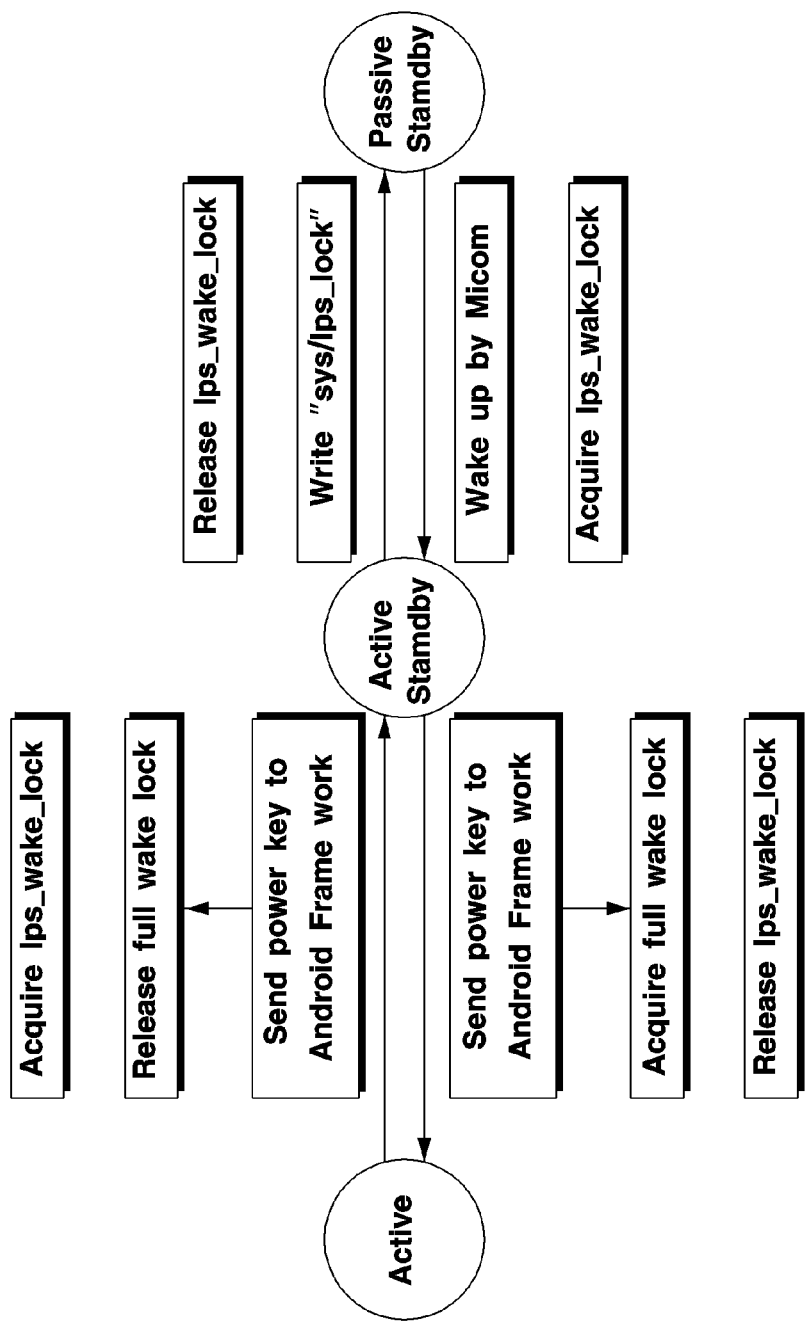
FIG. 3 is a transition diagram of a power state.

FIG. 3 illustrates a power state transition procedure in detail. Referring to FIG. 3, the active state changes into the active standby state in response to an OFF button press event of the remote controller, which is generated by the user, being sent to the Android framework.

To change from the active state into the active standby state, the Android framework releases a full wake lock for the STB first. Thereafter, the Android framework acquires a partial wake lock.

"lps_wake_lock" shown in FIG. 3 refers to a kind of partial wake lock and "lps" is an abbreviation of Low Power System.

FIG. 3 illustrates only the circumstance where the user generates the OFF button press event of the remote controller. However, when the active standby timer times out, the active state may change into the active standby state without any remote controller input event of the user.

On the other hand, the active standby state changes into the active state in response to an ON button press event of the remote controller generated by the user being sent to the Android framework.

To change from the active standby state into the active state, the Android framework acquires the full wake lock for the STB first and releases the partial wake lock.

4.3. Passive Standby State

In the passive standby state, the processor is in a shutdown state and the Android framework is in a sleep state.

As shown in FIG. 3, to change from the active standby state to the passive standby state, the Android framework releases the partial wake lock which is acquired in the active standby state. The Android framework assigns the power control right for the system to the MCU (write "sys/lps lock").

To change from the passive standby state to the active standby state, the MCU wakes up the processor and the Android framework first and then the Android framework acquires the partial wake lock.

5. Configuration of the STB S/W-Application and the Like

Figure 4:
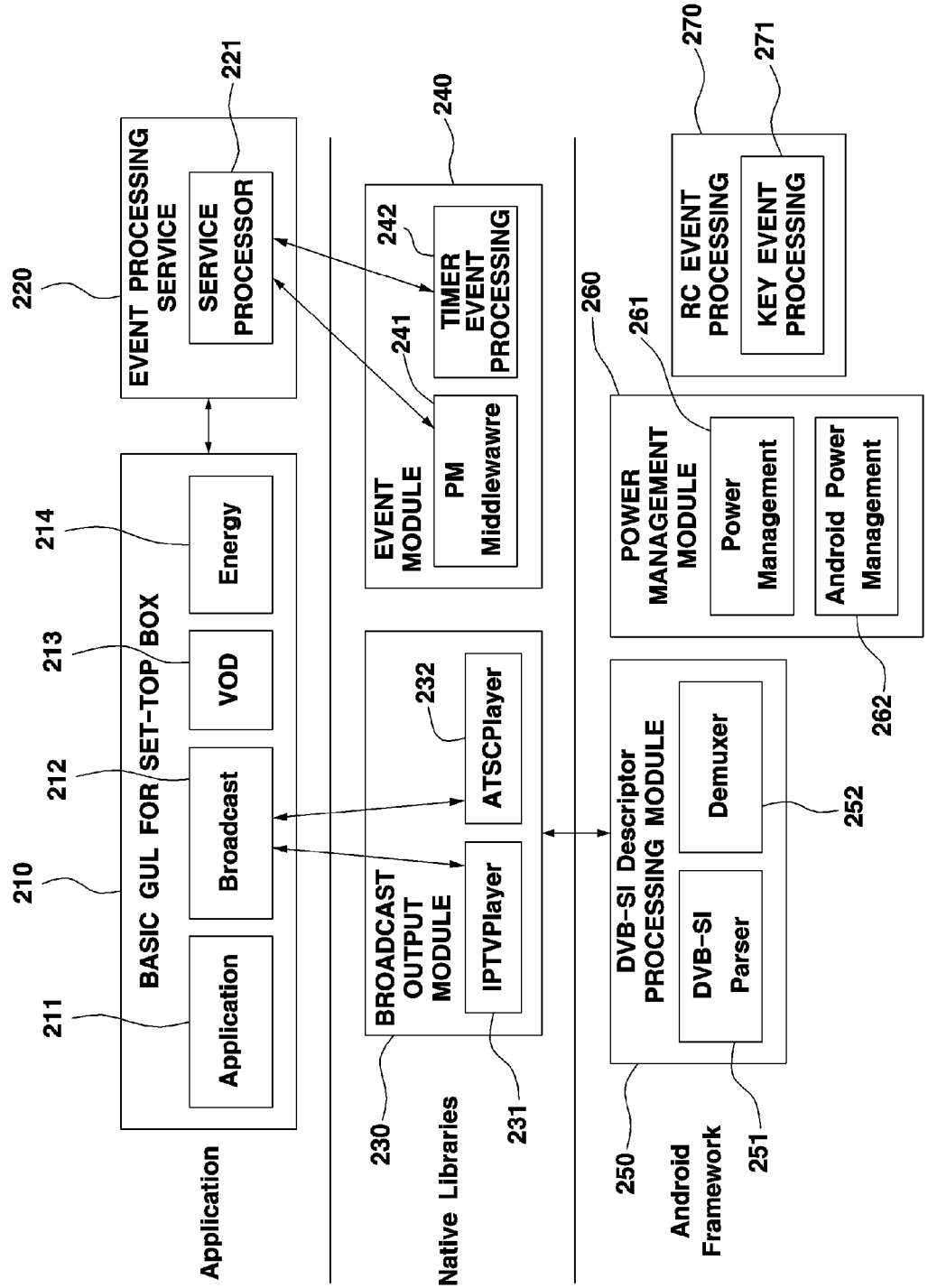
FIG. 4 is a view showing configurations of an application, Native Libraries, and an Android framework as an STB S/W configuration.

FIG. 4 illustrates a configuration of an application, Native Libraries, and an Android framework as a configuration of the STB S/W.

As shown in FIG. 4, the STB S/W includes: 1) an application layer including a GUI module 210 and an event processing service module 220; 2) Native Libraries including a broadcast output module 230 and an event module 240; and 3) an Android framework layer including a DVB-SI Descriptor processing module 250, a power management module 260, and a Remote Controller (RC) event processing module 270.

The GUI module 210 is a module configured as an application to perform an application, a broadcast, a VOD service, and an energy saving function, and the broadcast output module 230 is a module for outputting an IPTV broadcast and a terrestrial digital broadcast to provide a broadcast service of the broadcast module 212. The DVB-SI Descriptor processing module 250 is a module for processing broadcast streams.

The event processing service module 220, the event module 240, the power management module 260, and the RC event processing module 270 control change of the power state in the STB by interworking with one another, and will be explained below in detail.

5.1. Auto Chance into Active Standby State

Figure 5:
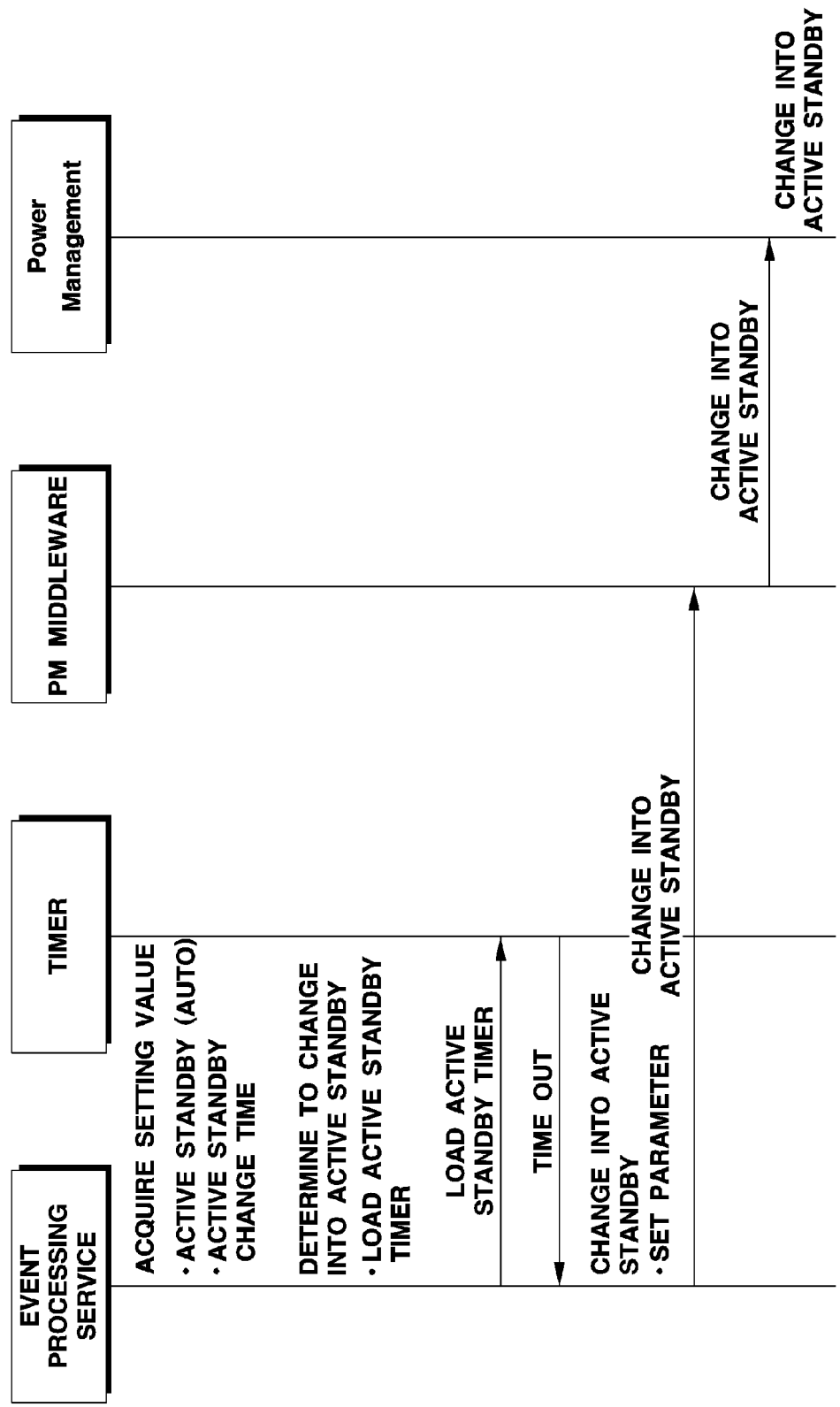
FIG. 5 is a view to explain a process of automatically changing from an active state into an active standby state.

FIG. 5 illustrates a view showing a process of automatically changing from the active state into the active standby state. The auto change from the active state into the active standby state is performed when the active standby timer times out without any input to the remote controller.

As shown in FIG. 5, when the event processing service module 220 recognizes that an STB environment is set for the STB to automatically change into the active standby state when an active standby change time elapses, the event processing service module 220 loads the active standby timer into a timer event processing module 242.

When the active standby timer times out without any remote control input from the user, the event processing service module 220 requests PM middleware 241 to change into the active standby state.

Then, the PM middleware 241 transmits an active standby change request to a PM module 261 which is provided in the power management module 260 of the Android framework. Accordingly, the change into the active standby state is performed by the PM module 261. The detailed process has been described with reference to FIG. 3 and thus is omitted here.

5.1. Manual Chance into Active Standby State

Figure 6:
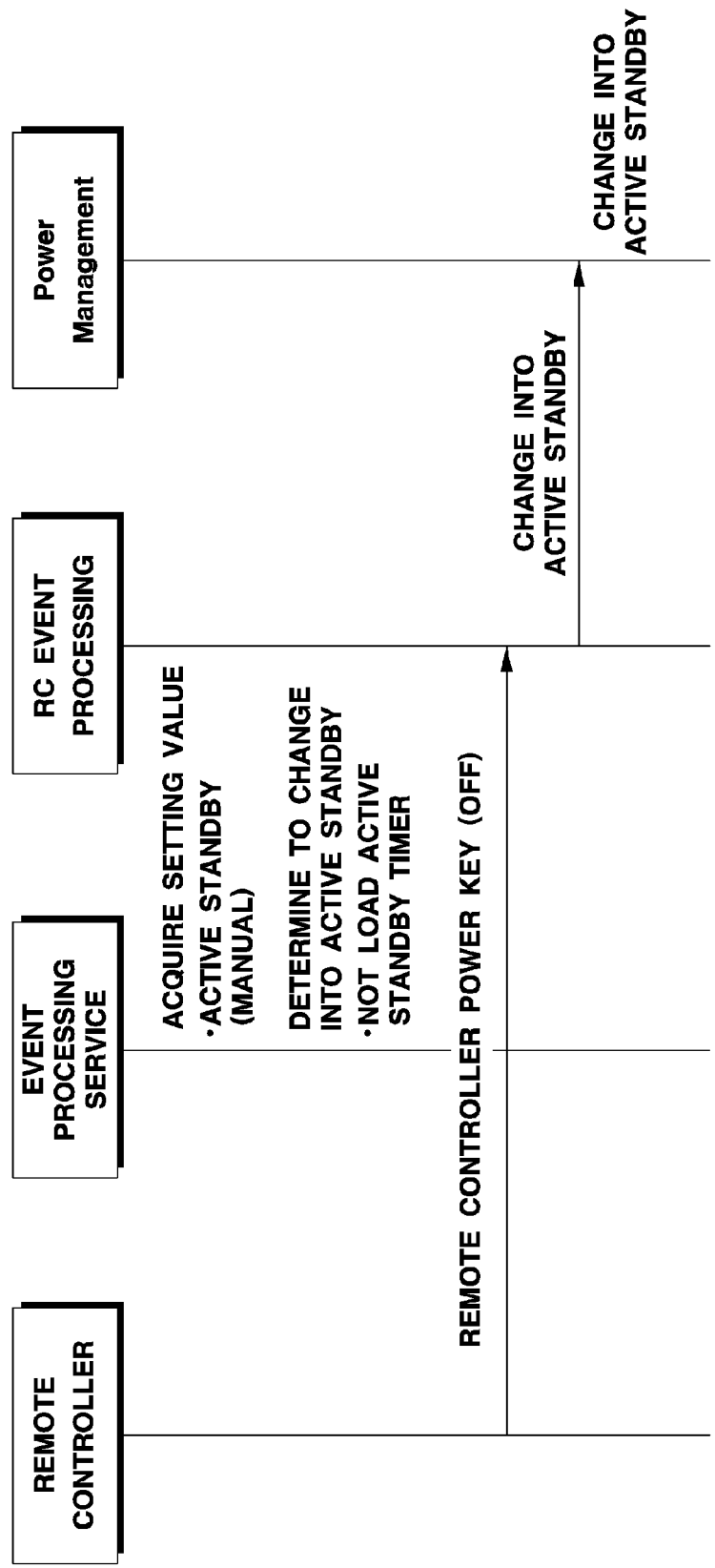
FIG. 6 is a view to explain a process of manually changing from an active state into an active standby state.

FIG. 6 illustrates a view showing a process of manually changing from the active state into the active standby state. The manual change from the active state into the active standby state is performed when the user presses the OFF button of the remote controller.

As shown in FIG. 6, when the STB environment is set for the STB to change into the active standby state when the OFF button (key) of the remote controller is pressed, and the RC event processing module 270 recognizes that the OFF key of the remote controller is pressed, the RC event processing module 270 requests the PM module 261 to change into the active standby state. Accordingly, the change into the active standby state is performed by the PM module 261. The detailed process has been described with reference to FIG. 3 and thus is omitted here.

5.3. Auto Chance into Passive Standby State

Figure 7:
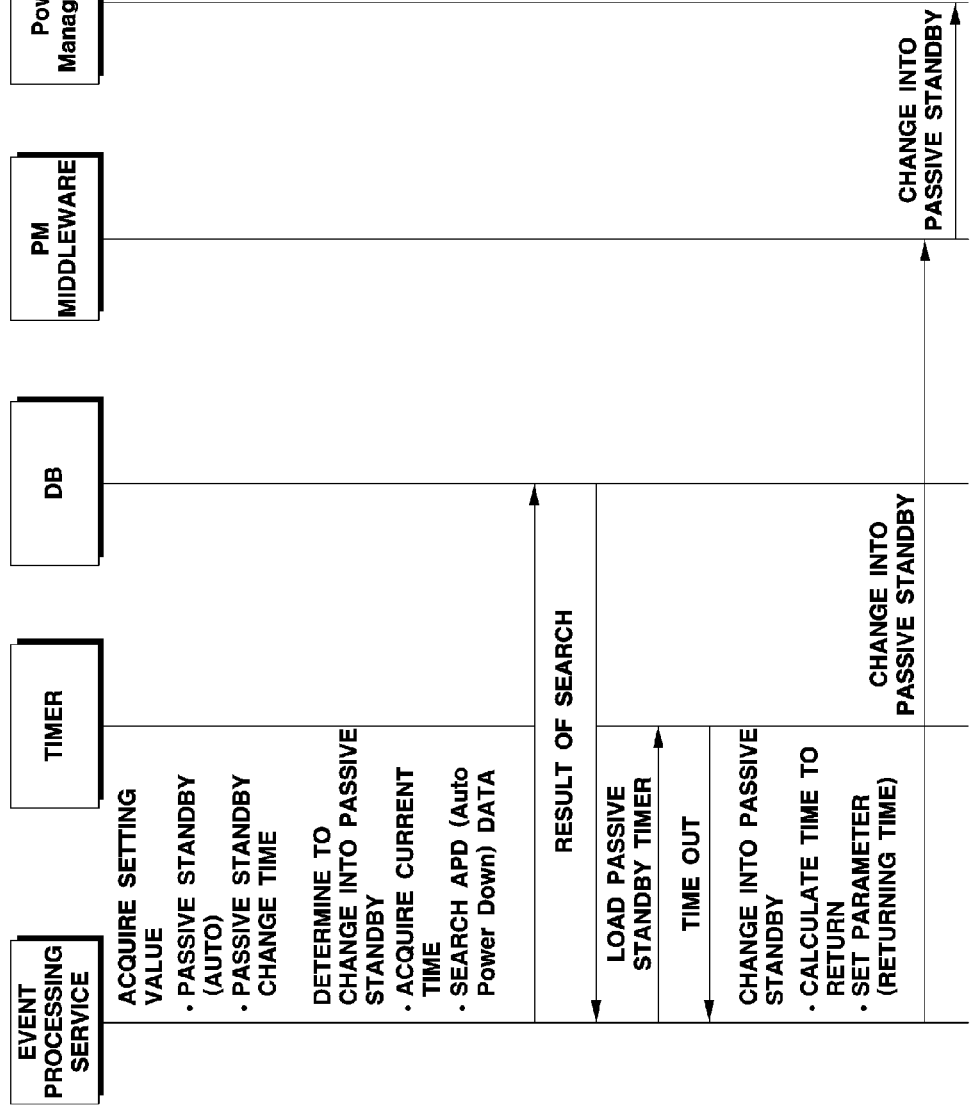
FIG. 7 is a view to explain a process of automatically changing from an active standby state into a passive standby state.

FIG. 7 illustrates a view showing a process of automatically changing from the active standby state into the passive standby state. The auto change from the active standby state into the passive standby state determines a time during which the STB is in the passive standby state based on Auto Power Down (APD) data generated from information provided by a broadcast server.

The APD data refers a background function performing time which is determined with reference to a time at which STB S/W update data or EIT update data necessary for performing the background function in the broadcast server are provided.

As shown in FIG. 7, the event processing service module 220 acquires a current time, searches and acquires the APD data from the DB, and loads the passive standby timer into the timer event processing module 242.

When the passive standby timer times out without performing the background function, the event processing service module 220 requests the PM middleware 241 to change into the passive standby state.

The request for the change into the passive standby state includes information on when the STB returns to the active standby state. The information on when the STB returns to the active standby state is determined based on the APD data and the current time.

The PM middleware 241 transmits the passive standby change request to the PM module 261 provided in the power management module 260 of the Android framework. Accordingly, the change into the passive standby state is performed by the PM module 261. The detailed process has been described with reference to FIG. 3 and thus is omitted here.

5.4. Manual Chance into Passive Standby State

Figure 8:
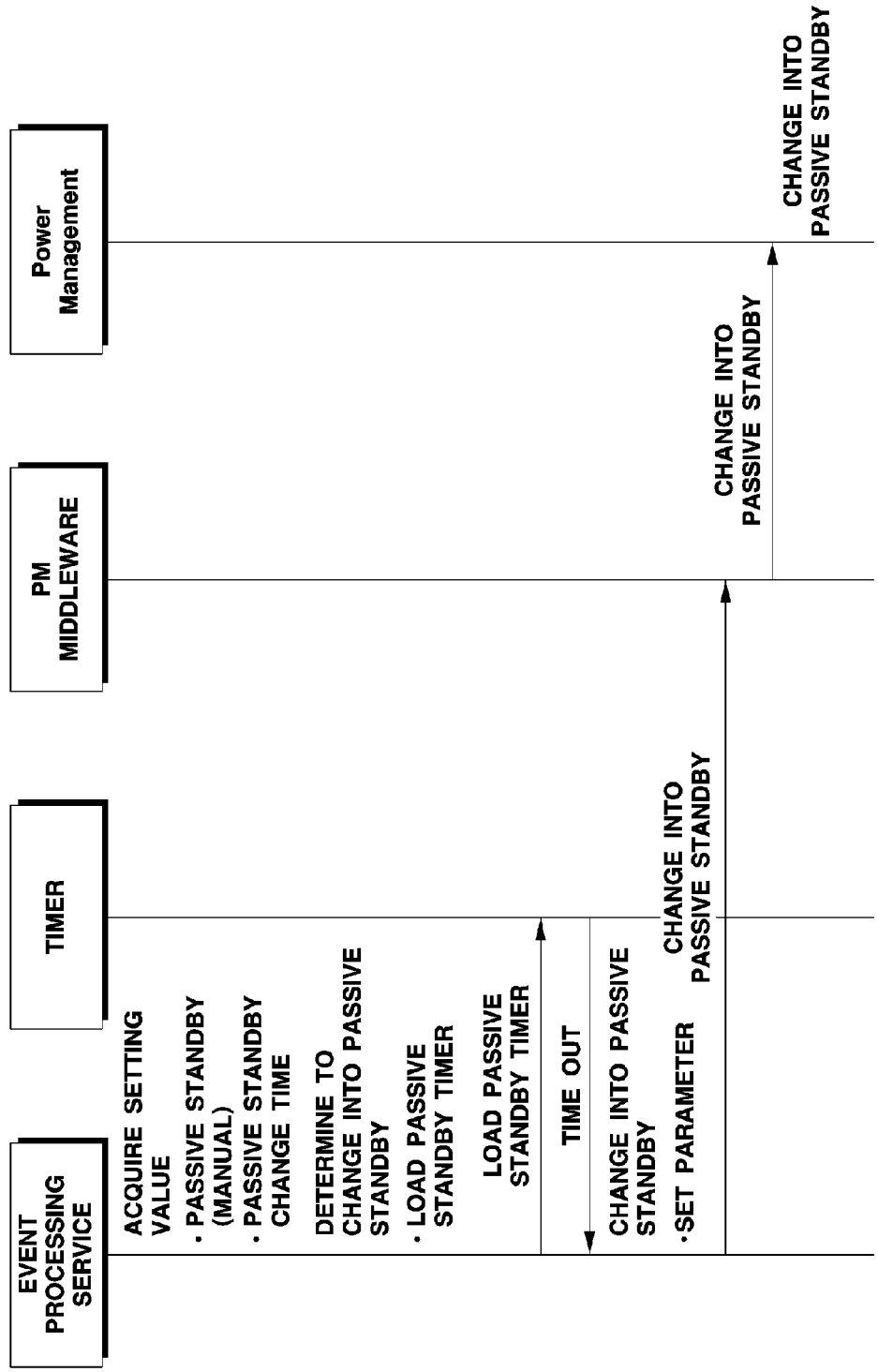
FIG. 8 is a view to explain a process of manually changing from an active standby state into a passive standby state.

FIG. 8 illustrates a view showing a process for manually changing from the active standby state into the passive standby state. The manual change from the active standby state into the passive standby state determines a time during which the STB is in the passive standby state based on a predetermined passive standby time.

As shown in FIG. 8, when the event processing service module 220 recognizes that the STB environment is set for the STB to change into the passive standby state when the passive standby time elapses, the event processing service module 220 loads the passive standby timer into the timer event processing module 242.

When the passive standby timer times out without performing the background function, the event processing service module 220 requests the PM middleware 241 to change into the passive standby state. The request for the change into the passive standby state includes information on the passive standby time.

The PM middleware 241 transmits the passive standby change request to the PM module 261. Accordingly, the change into the passive standby state is performed by the PM module 261. The detailed process has been described with reference to FIG. 3 and thus is omitted here.

The technical idea of the present disclosure is applicable when the Android framework and the Linux kernel are substituted with other frameworks and other kernels.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for operating multiple standby states, performed by a Set Top Box (STB) comprising processors which control the STB by using a framework, the method comprising:

releasing, by the framework, a full wake lock for the STB, the full wake lock is for sustaining a power state in which both main functions and background functions of the STB are able to be performed;

acquiring, by the framework, a partial wake lock for the STB and entering a first standby state, wherein the partial wake lock is for sustaining a power state in which only background functions of the STB are able to be performed;

shutting down a main processor of the STB;

releasing, by the framework, the partial wake lock and entering a second standby state;

waking up the main processor of the STB; and acquiring, by the framework, the partial wake lock and returning to the first standby state.

2. The method of claim 1, wherein the waking up is performed by an auxiliary processor which is communicably connected with the main processor.

3. The method of claim 1, further comprising acquiring, by the framework, the full wake lock for the STB and returning to an active state.

4. The method of claim 1, wherein the main functions comprises one or more of broadcasting, Video On Demand (VOD) service, and recording, and wherein the background functions comprises one or more of STB software update and Event Information Table (EIT) update.

\* \* \* \* \*